(12) United States Patent
Dumm et al.

(10) Patent No.: US 8,105,692 B2
(45) Date of Patent: Jan. 31, 2012

(54) PROCESS EQUIPMENT WEAR SURFACES OF EXTENDED RESISTANCE AND METHODS FOR THEIR MANUFACTURE

(75) Inventors: Timothy Dumm, Westerville, OH (US); John William Lucek, Powell, OH (US); John Petreanu, Gahanna, OH (US); Marc Gary Davidson, Dublin, OH (US); Bruce Wayne Hofer, Lewis Center, OH (US)

(73) Assignee: Diamond Innovations Inc., Worthington, OH (US)

( * ) Notice: Subject to any disclaimer, the term of this patent is extended or adjusted under 35 U.S.C. 154(b) by 955 days.

(21) Appl. No.: 10/544,798

(22) PCT Filed: Feb. 6, 2004

(86) PCT No.: PCT/US2004/003586
§ 371 (c)(1),
(2), (4) Date: Feb. 13, 2006

(87) PCT Pub. No.: WO2005/002742
PCT Pub. Date: Jan. 13, 2005

(65) Prior Publication Data
US 2006/0165973 A1    Jul. 27, 2006

Related U.S. Application Data

(60) Provisional application No. 60/445,631, filed on Feb. 7, 2003, provisional application No. 60/445,615, filed on Feb. 7, 2003, provisional application No. 60/445,659, filed on Feb. 7, 2003, provisional application No. 60/445,633, filed on Feb. 7, 2003, provisional application No. 60/445,609, filed on Feb. 7, 2003, provisional application No. 60/445,610, filed on Feb. 7, 2003, provisional application No. 60/445,632, filed on Feb. 7, 2003, provisional application No. 60/447,808, filed on Feb. 14, 2003.

(51) Int. Cl.
*B32B 15/00* (2006.01)
(52) U.S. Cl. ............ 428/408; 51/307; 51/309; 428/325; 428/332; 428/469; 428/472; 428/698; 428/701
(58) Field of Classification Search .................... 51/307, 51/309; 428/323, 325, 332, 469, 472, 698, 428/701, 702, 704, 408
See application file for complete search history.

(56) References Cited

U.S. PATENT DOCUMENTS
3,762,882 A    10/1973    Grutza
(Continued)

FOREIGN PATENT DOCUMENTS
EP    0 212 879 B1    11/1989
(Continued)

OTHER PUBLICATIONS

IBM Technical Disclosure Bulletin, "Low Porosity Plating Method for Sintered Powered Metals", vol. 38, No. 8, Aug. 1995, pp. 445-447.

*Primary Examiner* — Archene Turner
(74) *Attorney, Agent, or Firm* — Maria C. Gasaway

(57) ABSTRACT

A method for producing process equipment having a wear surface having extended resistance to one or more of abrasion, erosion, or corrosion, associated with fillers or solids processed by said process equipment includes applying to said process equipment wear surface a metal matrix coating filled with superabrasive particles. Diamond and cubic boron nitride superabrasive particles can fill the metal matrix, which can be a nickel coating.

17 Claims, 5 Drawing Sheets

U.S. PATENT DOCUMENTS

| | | | |
|---|---|---|---|
| 3,919,717 A | 11/1975 | Cullen et al. | |
| 3,936,577 A | 2/1976 | Christini et al. | |
| 3,955,324 A | 5/1976 | Lindstrom | |
| 4,197,902 A * | 4/1980 | Von Jan et al. | 164/418 |
| 4,219,004 A * | 8/1980 | Runyon | 125/15 |
| 4,328,266 A | 5/1982 | Feldstein | |
| 4,358,923 A | 11/1982 | Feldstein | |
| 4,547,407 A | 10/1985 | Spencer, Jr. | |
| 4,681,817 A | 7/1987 | Shinada | |
| 4,919,974 A * | 4/1990 | McCune et al. | 51/293 |
| 4,951,953 A | 8/1990 | Kim | |
| RE33,767 E * | 12/1991 | Christini et al. | 428/323 |
| 5,096,465 A | 3/1992 | Chen et al. | |
| 5,355,637 A * | 10/1994 | Wiltshire et al. | 51/295 |
| 5,370,364 A * | 12/1994 | Kenmoku et al. | 123/188.3 |
| 5,378,499 A * | 1/1995 | Martin et al. | 427/419.7 |
| 5,469,777 A * | 11/1995 | Rao et al. | 123/193.6 |
| 5,472,787 A | 12/1995 | Johnson et al. | |
| 5,482,637 A | 1/1996 | Rao et al. | |
| 5,547,716 A | 8/1996 | Thaler | |
| 5,597,625 A | 1/1997 | Ong et al. | |
| 5,695,387 A | 12/1997 | Moravec et al. | |
| 5,755,299 A * | 5/1998 | Langford et al. | 51/295 |
| 6,138,779 A | 10/2000 | Boyce | |
| 6,158,984 A * | 12/2000 | Cao et al. | 417/423.1 |
| 6,254,461 B1 | 7/2001 | Benning et al. | |
| 6,258,721 B1 | 7/2001 | Li et al. | |
| 6,289,588 B1 * | 9/2001 | Graf | 29/895.31 |
| 6,306,466 B1 | 10/2001 | Feldstein et al. | |
| 6,347,981 B1 * | 2/2002 | Holzapfel | 451/56 |
| 6,404,207 B1 | 6/2002 | Bhushan | |
| 6,425,805 B1 * | 7/2002 | Massa et al. | 451/40 |
| 6,500,488 B1 | 12/2002 | Chang et al. | |
| 6,503,642 B1 | 1/2003 | Linde | |
| 6,515,254 B2 | 2/2003 | Beck et al. | |
| 6,562,288 B2 * | 5/2003 | Park | 425/78 |
| 7,134,868 B2 | 11/2006 | Babin et al. | |
| 7,458,765 B2 * | 12/2008 | Stiles et al. | 416/241 R |
| 2001/0033804 A1 | 10/2001 | An | |
| 2004/0162014 A1 | 8/2004 | John | |
| 2006/0040126 A1 | 2/2006 | Richardson et al. | |

FOREIGN PATENT DOCUMENTS

| | | |
|---|---|---|
| GB | 2038214 | 7/1980 |
| JP | A-59059352 | 9/1982 |
| JP | A-2118080 | 10/1988 |
| JP | 2003-175406 | 6/2003 |
| WO | WO 95/02078 | 1/1995 |
| WO | WO 97/06339 | 2/1997 |
| WO | WO 99/28084 | 6/1999 |
| WO | WO 00/60137 | 10/2000 |
| WO | WO 02/062530 A1 | 8/2002 |

* cited by examiner

PROCESS EQUIPMENT WEAR SURFACES OF EXTENDED RESISTANCE AND METHODS FOR THEIR MANUFACTURE

CROSS-REFERENCE TO RELATED APPLICATIONS

This application is a U.S. national phase of international application PCT/US2004/003586, filed on Feb. 6, 2004, which claims the benefit of priority to provisional applications 60/445,631; 60/445,615; 60/445,659; 60/445,633; 60/445,609; 60/445,610; and 60/445,632; each of which was filed on Feb. 7, 2003; and 60/447,808, which was filed on Feb. 14, 2003.

BACKGROUND OF THE INVENTION

The present invention relates to process equipment that handles/processes flowable/moveable materials that may be filled with a second solid phase, or which are just the flowable/moveable second solid phase. The action of such solids presents process wear surfaces with accelerated abrasion, corrosion, and/or erosion, to which the present invention provides improved resistance.

A variety of process equipment has wear surfaces that are subjected to accelerated abrasion, corrosion, and/or erosion including, for example, forming tools, extrusion and compounding equipment, size reduction and size classification equipment, orifices and related components, engines (turbine, diesel, and Otto cycle), projectile weapons (firearms), clipper blades and combs, and the like. Normally, such equipment handles liquid and gas process streams that contain a second, solid phase. Such solids impinge upon the process equipment wear surface and cause accelerated abrasion, corrosion, and/or erosion.

Additionally, some process equipment handles just the solids themselves, such as, for example, a web or thread of paper, fabric, plastic, or the like. Such solid web also presents process equipment wear surfaces with accelerated abrasion, corrosion, and/or erosion. Even air containing entrained particulates will accelerate the wear to pipe elbows, for example. Thus, it will be appreciated that process equipment represents a wide variety of equipment that have wear surfaces that are adversely affected by the relative movement between the wear surface and a solid in contact therewith, whether or not the solid is entrained in a gas or a liquid.

While affixing or applying a wear-hardening layer to the process equipment wear surfaces, such as, for example, a liner, or manufacturing wear surfaces from more rugged material addresses the accelerated abrasion, corrosion, and/or erosion to some extent, the artisan is readily aware that much more is needed for a variety of applications for a wide variety of process equipment.

Heretofore, a variety of hard surface coatings have been proposed. U.S. Pat. No. 5,891,523 proposes a pre-heat treatment of a metal combing roll prior to an electroless Ni coating with diamond and U.S. Pat. No. 4,358,923 propose electroless coatings of metal alloy and particulates that include polycrystalline diamond. Molding dies have been hard faced with electroless coatings of Ni—P and Ni—P—SiC (*Handbook of Hardcoatings*. Bunshah, R. F. Editor, Noyes Publishing, 2001). It also has been proposed to co-deposit other solid particles within electroless Ni—P coatings, including SiC, $B_4C$, $Al_2O_3$, diamond, PTFE, $MoS_2$, and graphite (Apachitei, et al., "Electroless Ni—P Composite Coatings: The Effect of Heat Treatment on the Microhardness of Substrate and Coating", *Scripts Materials*, Vol. 38, No. 9, pp. 1347-1353, Elsevier Sciences, Ltd. 1958). Additional Ni—P wear coatings are discussed by Bozzini, et al., "Relationships among crystallographic structure, mechanical properties and tribiological behavior of electroless Ni—P (9%)/$B_4C$ films", *Wear*, 225-229 (1999) 806-813; Wang, et al., "Scuffing and wear behavior of aluminum piston skirt coatings against aluminum cylinder bore", *Wear*, 225-229 (1999) 1100-1108; Hamid, et al., "Development of electroless nickel-phosphorous composite deposits for wear resistance of 6061 aluminum alloy", *Material Letters*, 57 (2002) 720-726; Palumbo, et al., "Electrodeposited Nanocrystalline Coatings for Hard-Facing Applications", *AESF SUR/FIN® Proceedings*, 686, 2002 Proceedings; Mallory, et al., "Composite Electroless Plating", Chapter 11, *Electroless Plating: Fundamentals and Applications*, American Electroplaters and Surface Finishers Society (1990); and Feldstein, et al., "Composite Electroless Nickel Coatings for the Gear Industry", *Gear Technology, The Journal of Gear Manufacturing*, 1997. A general statement on the principal of electroless nickel plating is given in *Wear in Plastics and Processing*, Chapter 2. Metals and Wear Resistant Hardfacings; 171 (1990).

BRIEF SUMMARY OF THE INVENTION

One aspect of the invention is a method for producing process equipment, which has a wear surface having extended resistance to one or more of abrasion, erosion, or corrosion associated with fillers or filled materials processed by the process equipment. Such extended resistance is achieved by forming the process equipment wear surface to bear a metal matrix composite filled with abrasive particles. Another aspect of the present invention is process equipment having a wear surface having extended resistance to one or more of abrasion, erosion, or corrosion associated with filled materials processed by said process equipment, wherein the equipment wear surface bears a metal matrix composite filled with abrasive particles.

A variety of process equipment will be described below, which equipment wear surfaces exhibit extended resistance to abrasion, erosion, or corrosion associated with filled materials processed by the process equipment. The invention will be exemplified by plating wear surface parts with a superabrasive composite. It should be understood, however, that additional processes for associating the filled composite can be practiced, as the skilled artisan is readily aware.

BRIEF DESCRIPTION OF THE DRAWINGS

For a fuller understanding of the nature and advantages of the present invention, reference should be had to the following detailed description taken in connection with the accompanying drawings, in which.

Figure 1:
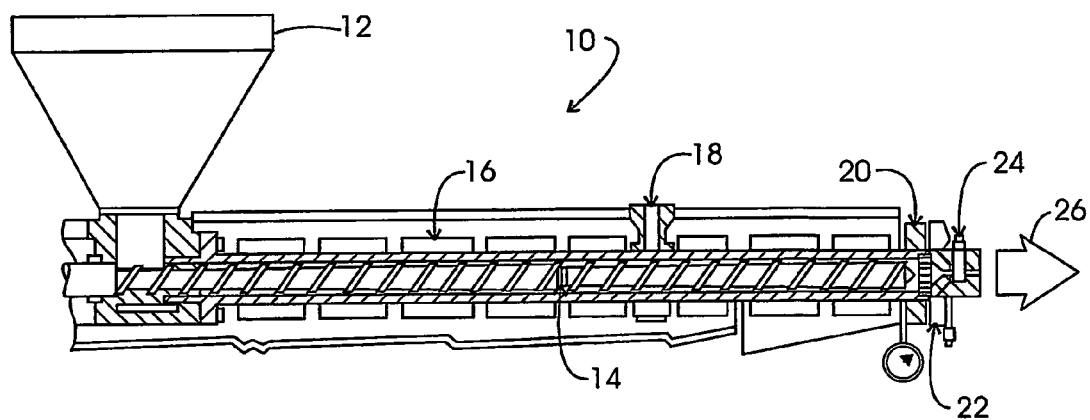
FIG. 1 is a schematic diagram showing one embodiment of the forming tools, i.e., extruder screw, barrel, and die, for use in an extruder operation.

The drawings will be described in further detail below.

DETAILED DESCRIPTION OF THE INVENTION

For the sake of clarity of understanding, the following terms are defined below (the singular includes the plural and vice versa):

"material" means a solid, liquid, or gas (including gels and other bodied and non-bodied substances), that may be carrier or a component of a composition that includes a filler.

"filler" means a solid or solid-like particle (often finely-divided, such as, for example, particulates, flakes, whiskers, fibers, and the like) that, when in a relative movement situation with a wear surface, causes accelerated abrasion, corrosion, and/or erosion and which comprises one or more of a ceramic, glass, mineral, cermet, metal, organic material (e.g., a plastic), cementitious material, cellulosic, or biomass (i.e., materials or secretions from a once-living organism, including, inter alia, bacteria, mollusk shells, virus particles, cell walls, nut shells, bones, bagasse, ice crystals, and the like). Filler does not include continuous fibers, strands, and sheets. Fillers also may be wanted (added, formed in situ, or the like) or may be unwanted (by-product, contaminant, or the like).

"filled" means that the material retains a filler (non-continuous) in a different phase from the material, including, inter alia, particulates, flakes, whiskers, fibers, and the like.

"flowable" means that the filler moves spatially relative to the process equipment wear surface, whether by movement of the wear surface, movement of the material, or movement of both; and includes relative movement by the movement of a material in which the filler is dispersed, movement by gravity, movement by positive/negative pressure, and the like; whether such movement is intended or not.

"fluent" means that the material is in the liquid phase (including by heating and by salvation) or the gaseous phase and is flowable.

"process equipment" means equipment that handles materials (filled and unfilled), whether by simple movement or by performing a chemical/mechanical/electrical operation on the material, and includes components of the process equipment that may have an intended or unintended wear surface. Process equipment does not include equipment for processing continuous fibers, strands, and sheets.

"superabrasive particle" means monocrystalline diamond (both natural and synthetic) and cBN.

"metal matrix composite" means a metal that bears a superabrasive particle.

"wear surface" means a surface of the process equipment (or a component thereof that has an intended or unintended wear surface) that is subject to abrasion, corrosion, and/or erosion by the action of the flowable filler, including the filler in a filled material.

A wide variety of process equipment handles fillers or discrete solids (often a filled material) and has one or more wear surfaces that are subject to abrasion, corrosion, and/or erosion by the action primarily of the solids (or solid-like in that liquid/gel droplets impinging on a wear surface may have the same wear effect as does a solid) that flow or move relative to the wear surface, such as, for example, solid filler in filled material being handled. Such process equipment includes, inter alia, engines, extrusion and compounding equipment, size reduction and size classification equipment, orifices, firearms, extruder dies, elbows in pipes, clippers, discontinuous fiber (glass, ceramic, polymeric) handling equipment, and the like. Such wear surfaces can be coated with a metal matrix composite and exhibit extended resistance to the deleterious action of the filler contacting such wear surfaces during movement of the filler.

Superabrasive Particles

Superabrasive or superhard materials in general refer to diamond, cubic boron nitride (cBN), and other materials having a Vickers hardness of greater than about 3200 kg/mm$^2$ and often are encountered as powders that range in size from about 1000 microns (equivalent to about 20 mesh) to less than about 0.1 micron. Industrial diamond can be obtained from natural sources or manufactured using a number of technologies including, for example, high pressure/high temperature (HP/HT), chemical vapor deposition (CVD), or shock detonation methods. CBN only is available as a manufactured material and usually is made using HP/HT methods.

Superabrasive (sometimes referred to as "ultra-hard abrasive") materials are highly inert and wear resistant. These superabrasive materials offer significantly improved combined wear (abrasion and erosion) and corrosion resistance when used as wear surface of forming tools.

In one embodiment, optional abrasive materials may be added to the superabrasive materials. Those abrasive materials can be fine solid particles being one or more of the boron-carbon-nitrogen-silicon family of alloys or compounds, such as, for example, hBN (hexagonal boron nitride), SiC, $Si_3N_4$, WC, TiC, CrC, $B_4C$, $Al_2O_3$. The average size of the abrasive materials (superabrasives as well as optional materials, sometimes referred to as "grit") selected is determined by a variety of factors, including, for example, the type of superabrasive/abrasive used, the type of the process equipment, the type of filled materials handled, and like factors.

In one embodiment of the invention, the volume percent of the superabrasive or abrasive particles that comprises the composite coating can range from about 5 volume percent (vol-%) to about 80 vol-%. The remaining volume of the coating in the composite includes of a metallic matrix that binds or holds the particles in place plus any additives.

In another embodiment of the invention, the particle size ranges for the abrasive materials in the composite are about 0.1 to up to about 6 mm in size (average particle size). In a further embodiment, the particle size ranges from about 0.1 to about 50 microns. In a yet further embodiment, the particle size ranges from about 0.5 to about 10 microns.

Depositing Coating(s) of Metal/Diamond (or CBN)

In one embodiment of the invention, a process for conventional electroplating of abrasives is used to deposit at least a coating of the superabrasive composites comprising diamond and/or cBN onto the wear surface(s) of the process equipment. The superabrasive composites are affixed to the wear surface(s) by at least one metal coating using metal electrodeposition techniques known in the art.

In one embodiment of the electroplating process, metal is deposited onto the process equipment wear surface until a desired thickness is achieved. The metal coating(s) have a combined thickness ranging from about 0.5 to about 1000 microns, and in one embodiment about 10% to about 30% of the height (i.e., diameter or thickness) of one abrasive particle in the superabrasive composites.

The metal material for the electrode or the opposite electrode to be composite electroplated is selected from shaped materials of one or more of nickel, nickel alloys, silver, silver alloys, tungsten, tungsten alloys, iron, iron alloys, aluminum, aluminum alloys, titanium, titanium alloys, copper, copper alloys, chromium, chromium alloys, tin, tin alloys, cobalt, cobalt alloys, zinc, zinc alloys, or any of the transition metals and their alloys. In one embodiment, the metal ions contained in the composite electroplating liquid are ions of one or more of nickel, chromium, cobalt, copper, iron, zinc, tin, or tungsten. The metal ions form a metal matrix of a single metal or an alloy or an, for example, oxide, phosphide, boride, silicide, or other combined form of the metal. When Ni is the metal matrix of choice, for example, Ni can be in the form of nickel-phosphorus (Ni—P) having a P content of less than about 5% by weight in one embodiment and less than about 3 wt-% in another embodiment.

The superabrasive particles of the present invention, Le., diamond or cubic boron nitride, and optional abrasive materials, are introduced into the plating bath for deposition onto the plated metal. The amount of superabrasive particles in the plating bath mixture can range from about 5% to about 30% by volume.

In another embodiment of the invention, an electroless metal plating process is used to place the superabrasive coating onto the process equipment wear surface. This process is slower than that of the electroplating process; however, it allows for the plating of the superabrasive coating of the present invention onto process equipment wear surface with intricate surfaces, e.g., deep holes and vias. Electroless (autocatalytic) coating processes are generally known in the art, and are as disclosed, inter alia, in U.S. Pat. No. 5,145,517, the disclosure of which is expressly incorporated herein by reference.

In one embodiment of an electroless metal process, the process equipment wear surface is in contact with or submerged in a stable electroless metallizing bath comprising a metal salt, an electroless reducing agent, a complexing agent, an electroless plating stabilizer of a non-ionic compound along with one or more of an anionic, cationic, or amphoteric compound, and quantity of the superabrasive particulates, which are essentially insoluble or sparingly soluble in the metallizing bath, and optionally a particulate matter stabilizer (PMS).

The superabrasives or grit are maintained in suspension in the metallizing bath during the metallizing of the process equipment wear surface for a time sufficient to produce a metallic coating of the desired thickness with the superabrasive materials dispersed therein.

In one example of a metallizing bath, in addition to the diamond or cBN, a wide variety of distinct matter can be added to the bath, such as, for example, ceramics, glass, talcum, plastics, graphites, oxides, silicides, carbonates, carbides, sulfides, phosphates, borides, silicates, oxylates, nitrides, fluorides of various metals, as well as metal or alloys of, for example, one or more of boron, tantalum, stainless steel, chromium, molybdenum, vanadium, zirconium, titanium, and tungsten. Along with the superabrasive materials, the particulate matter is suspended within the electroless plating bath during the deposition process and the particles are co-deposited within the metallic or alloy matrix onto the surface of the forming tools.

In one embodiment of the invention, prior to the plating process, the process equipment wear surface to be metallized/coated is subjected to a general pretreated (e.g., cleaning, strike, etc.) prior to the actual deposition step. In another embodiment, in addition to the actual plating (deposition), there is an additional heat treatment step after the metallization of the wear surface (substrate) of the forming tool. Such heat treatment below about 400° C. provides several advantages, including, for example, improved adhesion of the metal coating to the substrate, a better cohesion of matrix and particles, as well as the precipitation hardening of the matrix.

In yet another embodiment of the invention and depending on the end-use of the process equipment, after the completion of the electroless or electroplating process to coat the superabrasive materials onto the surface of the forming tools, an organic size coating may be applied over the metal coating(s) and the superabrasive composites. Examples of organic size coatings include one or more of phenolic resins, epoxy resins, aminoplast resins, urethane resins, acrylate resins isocyanurate resins, acrylated isocyanurate resins, urea-formaldehyde resins, acrylated epoxy resins, acrylated urethane resins or combinations thereof, and may be dried, thermally cured or cured by exposure to radiation, for example, ultraviolet light.

Forming Tools

Forming tools, including, inter alia, rolling, spinning, shearing, bending, drawing, swaging, hot forging, coining, extrusion, injection molding, compression molding, transfer molding, and laminating, are used to form a variety of materials, including, inter alia, metals, plastics, elastomers, ceramics, and composites. Forming tools in general involve the forcing of materials between moving surfaces, or between stationary and moving surfaces. In some operations, such as an extrusion process, the forming tools also are subject to high shear rates due to mixing, shearing, rotating, and like actions. In some operations, the materials being processed may contain abrasives (e.g., glasses, ceramics, cements, cermets, etc.) or corrosive substances (e.g., chemicals, metals, etc.). The active surfaces of forming tools typically are made from high performance materials, such as, for example, heat treated ferrous alloys, high temperature alloys (e.g., SAE 4140), carbide composites, or ceramics. Some tools are toughened further by flame treatment to increase the hardness. Additionally, films, coatings, or surface modifications, such as, for example, plating with chrome or nickel, may enhance the life of the tool forming components.

Forming tool abrasion, corrosion, and erosion (including wear) limit productivity in many industrial processes. Replacement and refurbishment of these forming components consume equipment capacity, increase direct and indirect product costs, and can affect product quality and yield. For example, pressure application rolls for forming cement-based building siding may be replaced or refurbished every 4 weeks. Metal forming rolls in a cold mill may be replaced as often as every three days, with replacement time consuming about 2%-3% of the mill's capacity. The abrasion, corrosion, and erosion of the tools used in these processes affect the formed product quality, properties, and production cost.

The forming tools of the present invention are those having a wear surface of a superabrasive composite, comprising one or more of diamond or cubic boron nitride (cBN), for use in operations including, inter alia, rolling, spinning, shearing, bending, drawing, swaging, hot forging, coining, extrusion, injection molding, compression molding, transfer molding, and laminating are used to form one or more of metals, plastics, elastomers, ceramics, or composites.

The superabrasive composites described above function as the wear surface of a number of forming tools, as the coating layer on top of the substrate base of forming tools for use in operations including, inter alia, extrusion, injection molding, compression molding, transfer molding, rolling, spinning, shearing, bending, drawing, swaging, hot forging, coining, or laminating are used to form one or more of metals, plastics, elastomers, ceramics, and composites.

In this embodiment of the invention, the forming tool is in the form of an extruder component, for use in extruding a wide variety of materials including, for example, plastics, cementitious dough, composites, and the like into a variety of shapes including structural shapes, such as, for example, flat sheet, contoured sheet, pipe, rod, I-beam, tube, honeycomb, and other solid or hollow shapes. The forming tools in this aspect of the present invention in an extruder operation can be in the form of the extruder barrel, screw, liner, orifice, or particularly extruder dies, as shown in a conventional screw-type extruder operation of FIG. 1. Such conventional screw-type extruder, 10, includes a hopper, 12, for receiving feedstock, which is fed into a two-stage screw, 14, which is provided with heaters/coolers, 16, and a gases vent, 18. The extruded material then passes a breaker plate, 20, swing gate, 22, and head pressure valve, 24, and exits to the takeaway equipment, as indicated at arrow 26.

In one embodiment of an extruder component, the forming tool is in the form of an extruder die, with the die substrate being made with rugged alloy steel such as, for example, SAE 4140, with Rockwell C hardness of 35 to 40. The screw substrate may be toughened further by flame treatment to a Rockwell C of 50 or higher, or protected by application of special hard-facing alloys such as, for example, chrome or nickel, prior to being coated with the superabrasive coating of the present invention.

In another embodiment of the invention, the forming tools are for use in powder/ceramic pressing operations in the form of punches and dies, for operations under pressure of at least 20 tsi (commonly in the range of about 20 to about 100 tsi) and at temperatures of at least 1200° F. (commonly of about 1400° F. to about 2000° F.). In this embodiment, the forming tools of the present invention are for pressing metal tool powders into parts, e.g., parts conventionally formed of ductile cast iron such as, for example, automotive engine and transmission parts, pinions, rollers, slides, valves, output shaft hubs, etc.

Figure 2:
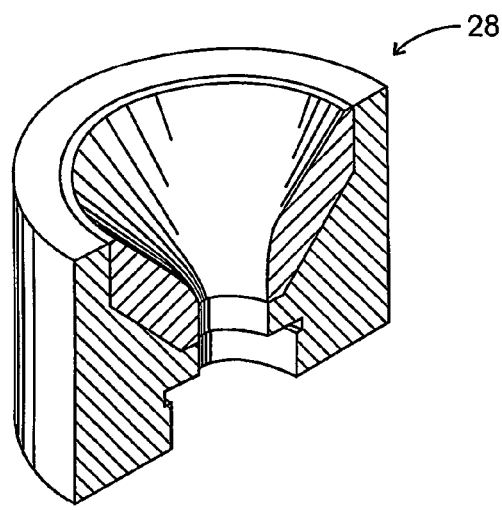
FIG. 2 is a cross-section of a die for use in a powder pressing operation.

FIG. 2 is a cross-section diagram of a die, 28, for use in a powder pressing operation. In one embodiment, the die substrate is made of, for example, a sintered hard alloy or an alloy steel having a Rockwell C hardness of at least about 70, and not more than 95, for a sufficient toughness and elasticity required to prevent cracking and chipping, even when coated with the superabrasive composites of the present invention.

Figure 3A:
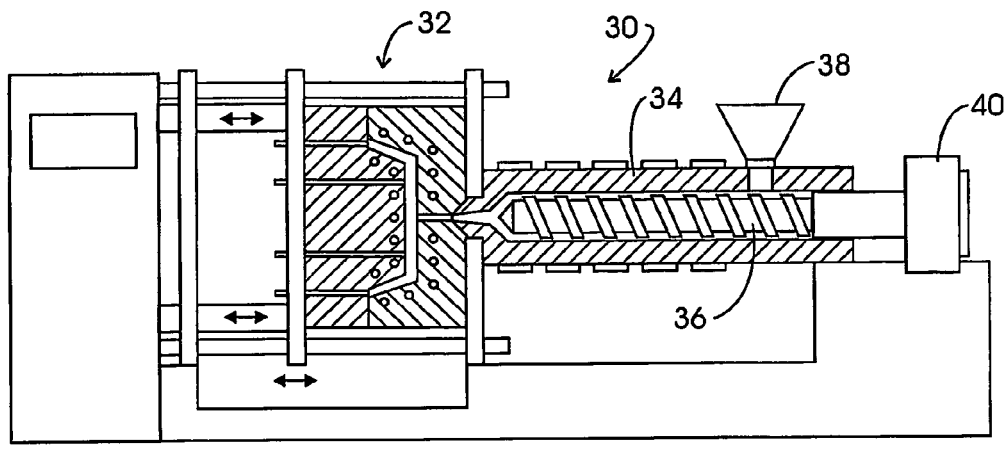
FIGS. 3A and 3B show one embodiment of the forming tools, i.e., injection molding barrel, screw, and die cast molds, for use in an injection molding operation.
Figure 3B:
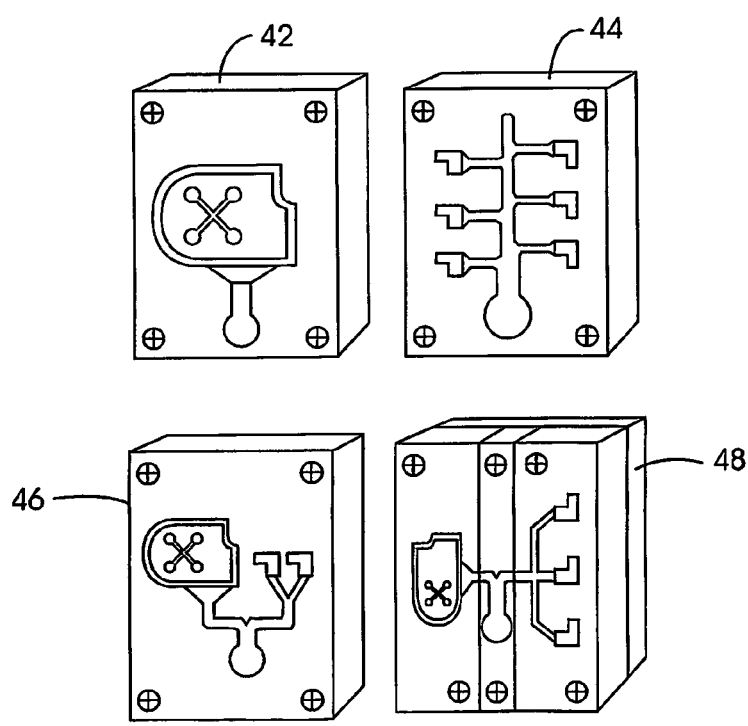

In a third embodiment of this aspect of the invention, the forming tools are components for use in an injection molding operation, 30, as shown in FIG. 3, which includes molding dies, 32, a barrel, 34, a screw, 36, a feed hopper, 38, and driver, 40, which often is a motor. These may include molding dies (stationary dies, as well as movable dies; see FIG. 3B for a representative single cavity die, 42; multiple cavity die, 44; combination die, 46; and unit die, 48), injection nozzles, sprue holes in the dies, runner grooves, heating barrels, cylinders, valve tips, hot runner tips and bodies and screws for driving the molded materials in the radial and axial directions. The typical conditions of molding operations are not as severe as in powder/ceramic pressing operations, but they are demanding on the molding equipment nonetheless. The specific temperature, pressure and time ranges in operations typically depend of the specific materials being molded and the type of the molding equipment in use. In one embodiment of a molding operation, the molding pressure is about 0.5 tsi to about 5 tsi, and with pressing temperature typically in the range of about 100° C. to about 250° C., and with the holding time within the mold is usually about 15 to about 120 seconds.

In one embodiment, the base substrate of the forming tools used in molding operations is made with substrate is made of a sintered hard alloy or an alloy steel such as nickel-based alloys and the like, e.g., nickel aluminide alloys, for high levels of resistance to corrosion and wear and abrasion.

In yet another embodiment of the invention, the forming tools are in the form of equipment for use in metal forming operations such as, for example, casting, laminating, or forging of metals.

Figure 4:
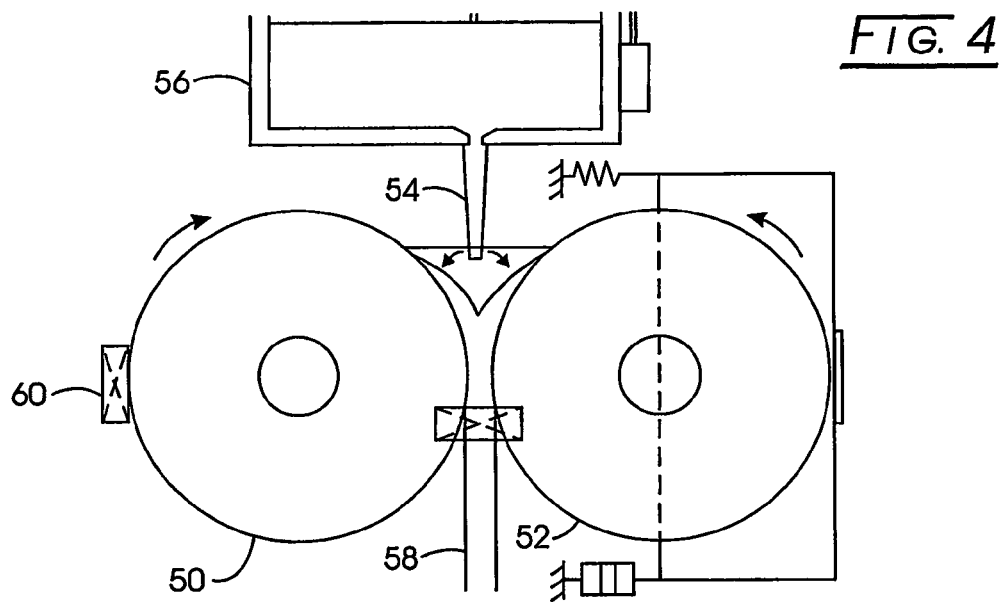
FIG. 4 is a schematic diagram showing the forming tools, twin rolls, and a casting nozzle, in use in a metal casting operation.

FIG. 4 illustrates how the forming tools of the present invention, casting rolls and a casting nozzle, are in a continuous metal casting operation. In this embodiment of a strip casting process, a pair of casting rolls, 50 and 52, coated with the superabrasive composites of the present invention, are in contact with molten metals at high temperatures (about 1100°-about 2000° C.) for extended periods of time (in some embodiment of at least 3 hours or more). Additionally, rolls 50 and 52 are subject to localized temperature differences (external contact with molten metal and internally cooling). A casting nozzle, 54, coated with the superabrasive composites of the present invention and connected to a distributor (not shown), encloses and pours the molten metal into the casting space from a reservoir, 56, of molten metal. The strip of metal, 58, exits from rolls 50 and 52. Motors (not shown) drive rolls 50 and 52 with force sensors, e.g., 60, being provided in conventional fashion along with additional equipment well known in the art.

The base substrate of the forming tools in casting operations typically comprise high performance (e.g., superalloys) for use at elevated temperatures, e.g., having the ASTM designation A-297-67 series of iron-chromium and iron-chromium-nickel alloys, for use at temperatures of up to 2500° F. and having high-temperature oxidation resistance.

In a yet further embodiment of the invention, the forming tools are used in a cold working operation, wherein metal blanks are forced into shape through plastic flow. The base substrate of the forming tools may be in the form of mandrels in cold rolling processes used to strain harden plate and sheet stocks (e.g., sheets, bars, rods, etc.) by reducing the thickness of the metal plate; or radially moving arbors or die mandrels for use in cold spinning or cold drawing processes.

As with the substrate of forming tools for use in processing metals, the base substrate of the dies, mandrels, etc. used in cold working operation typically comprises high-performance or rugged alloy steels and the like.

Extrusion and Compounding Equipment

Extrusion and compounding are common industrial processes for manufacturing many types of materials including, for example, plastics, powder coatings and toners, rubbers, aluminum, and food products. The process generally involves an extruder, which contains a number of moving and stationary parts. Examples include, inter alia, extruder barrels, screw or screw segments, barrel liners, couplings, dies, and knives. Depending on the abrasive, erosive, and corrosive nature of the material being compounded and/or extruded, these parts can wear excessively leading to increased equipment downtime, high maintenance, and/or high repair costs. Part wear also can cause product quality problems such as, for example, poor homogeneity, undesirable reactions, high volatile content, and poor geometric tolerances. Another problem, which can occur in some compounding and extrusion equipment, is retention or "hang up" of small quantities of material that become degraded and, when released, contaminate the product.

Continuous compounding and extrusion commonly are performed in an extruder, typically of the single-screw or double-screw type. Twin-screw extruders come can be corotating or counter-rotating. The extruder can perform many functions including, for example, mixing, kneading, homogenizing, melting, reacting, cooking, and devolatizing. The material to be compounded and/or extruded is fed into the extruder body and consists of a "barrel" which surrounds the screw(s). Rotation of the screws provides mixing action, exposes new surface area of the material, and propels the material down the length of the extruder. The barrel sections can be heated and/or cooled to provide temperature control for melting, reaction, devolatilization, and/or cooking. Feed ports at various locations along the barrel allow for addition of materials in solid and liquid form and vents allow for removal of vapors. As the material leaves the barrel of the extruder, it can be extruded through a die, solidified and/or chopped. These extruders can operate at about 1200 rpm or more with a throughput of up to about 75 tons/hr.

Continuous compounding can be performed with similar equipment such as pug mills, Ko-kneaders and trough-and-screw mixers. Batch compounding can be performed with equipment such as a double-arm kneading mixer, Banbury mixer, or roll mill.

All such extruder designs involve squeezing of the material to be processed between stationary and rotating surfaces to provide a shearing and mixing action. Extrusion of the material involves forcing the material under pressure through an orifice. These processes force the material to flow past the equipment components. When the material being processed contains abrasive or corrosive substances, the equipment is subject to wear. This is especially true in systems where high shear rates are used to increase mixing, melt rates, throughput, etc., or when highly abrasive materials, such as glass or minerals, are compounded. The equipment components are most commonly made from surface hardened (nitrided) alloy steels. Special alloys such as INCONEL and HASTELLOY can be used in corrosive environments.

To improve the wear resistance of compounding and extrusion equipment components a number of techniques have been used. Extruder barrels can be protected using a liner made high-chrome, high-carbon alloys or Ni—, Co— or other alloys. Coatings consisting of Ni— or Cr— alloys, powdered metals or tungsten carbide-metal composites have bee applied to barrels, liners, and screw components. While these components have reduced wear rates and can lower maintenance costs and quality problems, abrasive, erosive and corrosive wear can still be a problem causing frequent shutdowns.

In this embodiment of the present invention, the wear surfaces of the compounding and extrusion equipment are coated with the metal matrix composite filled with abrasive particles. The same process as described above (e.g., electrolytic or electroless) is used in the same manner as described in greater detail for the forming equipment.

Size Reduction and Size Classification and Separation

This embodiment of the present invention relates to the use of diamond/cBN composite coatings for improving the abrasive wear characteristics of components within size reduction and size classification and separation equipment. Examples of this type of equipment include, for example, fluid energy mills (jet mills), hammer mills, pin mills, cage mills, attrition mills, air classifiers, cyclones, screens, etc. Examples of critical components within this equipment include, for example, rotor vanes, stator rings, impact plates, venturi tubes, impact pins, hammers, screens, etc.

In these types of equipment, a powder is entrained in a moving fluid stream and is often being propelled at a high velocity. The abrasive wear of critical components in milling and size classification and separation equipment may contaminate the product and eventually cause complete failure of the component and, thus, the entire piece of equipment. When failure of the critical components occurs, the process must be shut down and the worn parts within the equipment replaced. The gradual wear of critical components also causes a decrease in the operating efficiency of the equipment over time. A considerable amount of equipment and process downtime occurs because of the need to replace worn parts.

Current abrasion resistant parts for milling and size classification and separation equipment consist of components made from or clad with tungsten carbide, silicon carbide, and aluminum oxide. Other surface treatments used for hard-facing components include: chrome plating, nickel plating, thermal flame spraying, and heat treatments such as carbiding, nitriding, and boriding. Certain wear parts, such as mill liners or plates, that have simple geometries can be fabricated from tungsten carbide or can be clad with ceramic plates. As part geometries become more detailed, a surface coating is the preferred method for providing wear resistance.

In this embodiment of the present invention, the wear surfaces of the size reduction and compounding equipment are coated with the metal matrix composite filled with abrasive particles. The same process as described above (e.g., electrolytic or electroless) is used in the same manner as described in greater detail for the forming equipment.

Orifice and Related Components

Orifices are widely used to control or measure fluid flow and pressure. Accurate performance is achieved by control of orifice geometry and fluid forces. Degradation of the orifice geometry by wear (erosion, abrasion, impingement) and corrosion (chemical, galvanic) must be avoided. There is a need for improved orifice materials offering both wear and corrosion resistance and it is such need that the present invention addresses.

Orifice applications include, for example, fluid velocity measurement devices (pitot tube), pressure and flow measurement (venturi gage and flow meters), fluid handling (pressure and flow control), and fluid dispersion (nozzles). Proper operation of the device requires precise and stable orifice geometry. Entrained solids, high temperatures, corrosive fluids, high fluid velocity, cavitation, and other effects can change the orifice and significantly limit orifice life. In many cases the orifice life may be measured in hours.

For example, spray drier nozzles inject chemical solutions or solid/liquid droplets into a heated fluid stream. The size and dispersion pattern of the droplets must be maintained for optimum throughput and complete drying. Swirl chambers in these nozzles convert fluid pressure to a tangential stream velocity and can wear/corrode quickly, degrading dispersion patterns and throughput. Erosion or corrosion of the nozzle changes the orifice geometry and droplet size. In this case dimensional changes of a few microns can result in incomplete drying or improperly sized dried product.

As another example, agricultural chemical sprayer nozzles degrade by both corrosion and erosion. These devices may be changed in as little as a few hours to maintain dispersion and flow rates. Other applications include, for example, fuel atomization, hot fluid velocity and flow measurement, fluid metering, ink jets, road salt and sealant application, and atomization plates. Depending on application, orifices may be made of brass (10 hour life in agricultural nozzle applications), nylon composites (50 hour life), stainless steel (150 hour life), or ceramics including single crystals such as sapphire (1500 hour life). Ceramic nozzles have sufficient life, but have low mechanical strength and are difficult to machine to narrow tolerances. Tungsten carbide also is used for demanding applications.

In this embodiment of the present invention, the wear surfaces of the orifices are coated with the metal matrix composite filled with abrasive particles. The same process as described above (e.g., electrolytic or electroless) is used in the same manner as described in greater detail for the forming equipment.

Turbine, Diesel and Otto Cycle Engines

This aspect of the present invention relates to the use of diamond/cBN composite coatings for improving the abrasive wear and corrosion characteristics of engine parts, which are subject to wear, including, inter alia, gas turbine engine parts, Diesel cycle engine parts, and Otto cycle engine parts.

Stationary and vehicular reciprocating engine components are subject to wear and corrosion. Lubrication interruption, contamination, and film thickness reduction can cause intermittent or continuous wear, inter alia, in valve train components, rings and cylinders, gears, and bearings. High velocity fluid flow erodes fuel injector components. Combustion products corrode critical surfaces on hot side and crankcase components. Aside from maintenance faults and infantile component failures, these wear and corrosion mechanisms limit engine life and fix the frequency for major maintenance. For example, locomotive diesel engine fuel injectors are replaced yearly and compression rings are replaced every 4 years.

Accordingly, reciprocating internal combustion engines incorporate wear resistant materials and highly engineered lubrication systems. Pressurized, filtered lubrication is universal. Lubricant monitoring for contamination and viscosity are becoming common. Surface hardened components are utilized at all wear points. Hard metallic coatings (chromium) have been used on piston rings for many years. Valve train components for racing engines are routinely surface hardened by "nitriding" or "boriding" processes to increase resistance to wear. Trials with ceramic coatings, ceramic valves, cylinder liners, and valve seats have been conducted. Ceramic cam followers are commercially available for diesel engines.

Gas turbine engines components similarly are subject to wear and corrosion. Gas turbine engines also spin at very high rotational speeds for long, continuous periods of time. Components within a turbine engine experience very high velocity airflows of up to 1300 mph (2080 kph) and at high pressures of up to 30 atmospheres. The rotating components experience wear from fretting, galling, abrasion, and from thermal/corrosive factors. Engines that are located close to the ground or in dusty environments, for even short periods of time, are particularly susceptible to abrasive wear from particles being sucked into the engine. The abrasive wear caused by entrained particles can change the chord width and tip heights of airfoils within the compressor section of the engine. Even small dimensional changes can have a significant detrimental effect on the ability of an engine to compress air thereby reducing the engine's overall performance. Ultimately, an engine's components will erode so much that the engine will need to be taken out of service and rebuilt. This, obviously, causes both downtime for the aircraft or power generation unit and adds cost for servicing the engine.

Modern gas turbines consist of several compressor stages. The compressor airfoils located on the initial stages of the compressor are most susceptible to abrasive wear by direct impact of particles sucked in from dusty environments. In order to improve the abrasive wear resistance of these components, they are normally coated with either a thermal spray cermet material or heat-treated to impart a nitrided (TiN) surface. Both of these coatings are harder and more wear resistant than the titanium material that the components are usually made from.

In order for the thermal spray coating to adequately adhere to the titanium substrate, it is usually necessary to grit-blast the surface of the component to create a rough surface. This process causes additional cost and variability to the coating process. Another technique used for improving abrasive wear is vapor gas diffusion nitriding. This process creates a hard, TiN layer that is chemically bonded to the substrate. There are several methods of applying this type of coating but, in general, this type of coating adds considerable cost to the engine components.

In this embodiment of the present invention, the wear surfaces of the engines are coated with the metal matrix composite filled with abrasive particles. The same process as described above (e.g., electrolytic or electroless) is used in the same manner as described in greater detail for the forming equipment.

Projectile Weapons (Firearms)

This aspect of the invention relates to the use of diamond composite coatings for improving the abrasive wear and corrosion characteristics of projectile weapons typified by firearms.

Firearms are designed to operate reliably under highly aggressive functional and environmental conditions. Tribochemical and mechanical wear reduce functional reliability and accuracy. Non-corrosive primer compounds, non-corrosive propellants, improved lubricants, and improved maintenance have failed to eliminate barrel erosion and mechanical wear in firearms. The recent substitution of lightweight alloys and polymeric materials for steel presents additional firearm wear and corrosion challenges. New solutions to these challenging wear and corrosion problems are needed.

Several corrosion and wear problems limit the life of firearms. Tribochemical chamber and barrel erosion occurs and limits the barrel life of artillery, military small and medium caliber military arms, service arms, target firearms, and heavily used sporting weapons designed for high velocity projectiles or steel shot. Non-corrosive primers, non-corrosive propellants, chromium coatings, projectile jackets, solid lubricant coatings, and improved maintenance methods are widely applied, but have limited effectiveness. Artillery and high rate-of-fire weapons require routine barrel replacement to maintain accuracy. High velocity sporting rifles have a barrel life measured in thousands of firings. The principal cause of these failures is propellant corrosion of the chamber throat (the region closest to the ammunition casing). Unjacketed, hard coated, or hardened projectiles are known to abrade rifling in military weapons and sporting shotguns. The operating mechanisms of all firearms also wear and corrode in service. Combustion products and environmental contaminants are deposited on closely fitted mechanical systems in all firearms. These contaminants can defeat or degrade lubrication and eventually reducing functional reliability.

The use of new materials such as reinforced polymers and lightweight alloys present new design challenges. These materials are not as easily lubricated or as wear resistant as prior art metal materials. Polymer weapon frames often include metal substructures for primary wear surfaces. Light alloys are often hard coated (anodized, plated, or ceramic coated) to improve their wear performance—adding to the production cost. Non-functional weapon surfaces are often treated to prevent general corrosion and preserve appearance. These coatings can be damaged by abrasion, temperature, and aggressive or extended exposure to corrosives.

In this embodiment of the present invention, the wear surfaces of projectile weapons (firearms) are coated with the metal matrix composite filled with abrasive particles. The same process as described above (e.g., electrolytic or electroless) is used in the same manner as described in greater detail for the forming equipment.

Drill Bit Bodies and Other Components for Oil and Gas Drilling

During exploration and drilling for oil and gas, drilling hardware is subjected to abrasive, erosive, and corrosive conditions. These wear modes reduce the useful life of hardware components and increase drill rig operating costs. Drill bit bodies used in oil and gas exploration and drilling are usually made from cemented tungsten carbide, due to its resistance to abrasion and erosion. However, due to the difficult nature of working with tungsten carbide, fabrication of drill bit bodies is complex, labor intensive, and costly. Steel drill bit bodies, which are easier and less costly to fabricate, are sometimes used, however they are not sufficiently wear-resistant for most applications. Wear also is a problem for many other components used in oil and gas drilling, such as, for example, radial and thrust bearings, mechanical couplings, wear pads, flow diverters and restrictors, mud pump liners, and impellers. Premature wear of these parts results in downtime and replacement cost.

There are two basic types of drill bits for exploration and drilling: drag bits and roller cones. Drag bit bodies generally consist of a single piece, whereas roller cone bit bodies are generally in three segments. Tungsten carbide drill bits of both types are fabricated in a complex, labor-intensive process. In both cases, the process begins with fabrication of a multiple-piece, graphite mold from solid graphite stock, which is machined into the general shape of the drill body and vanes. Inserts are placed by hand into the mold to provide detailed recessed features, such as pockets for polycrystalline diamond cutters (PDC), and held in place with modeling clay. The graphite mold is assembled and filled with tungsten carbide powder and binder (typically Co based). The filled mold then is fed to a furnace to sinter the carbide. Following the sintering cycle, the graphite mold is broken off the sintered carbide body. Each new bit body requires fabrication of a new graphite mold. The rough drill bit body then is finished through a series of grinding and/or machining operations. When PDC cutters are used, they are usually brazed into pockets in the drill bit body.

Fabrication of a steel bit body is far simpler and less costly. The detailed geometry can be machined directly out of steel stock, using CNC (computer numerical control) machining and grinding methods. A similar approach would be cost prohibitive with tungsten carbide due to the cost of cemented tungsten carbide and the relative difficulty in machining or grinding it. In order to "harden" steel bit bodies, they can be post-treated to improve their wear and corrosion resistance through nitriding or coating, but in most cases the improvement has not been adequate to replace tungsten carbide.

Many other components of exploration and drilling equipment are subject to wear by corrosion, abrasion, or erosion, including, for example, radial and thrust bearings, mechanical couplings, wear pads, flow diverters and restrictors, mud pump liners and impellers, drill pipe, valves, directional drilling assemblies, hanger assemblies, percussion assemblies, nozzles, core lifters. Many different coating methods have been tried for improving the abrasion and corrosion resistance of these components. These include thermal spray, diffusion alloy and carbide composite coatings, as well as nickel and chrome plating. While these coatings can improve the life of the part, none has proven particularly effective in increasing the abrasion and/or corrosion resistance of these components. Downtime and replacement costs remain a problem.

In the first embodiment of the invention, a process for conventional electroplating of abrasives is used for depositing at least a coating of the superabrasive composites comprising diamond and/or cBN onto the surface of the drill bit or other components. Because the coating can be applied to a structural material, such as steel, reinforced composites, ceramics or plastics, breakage during installation or catastrophic failure in service will be nearly eliminated. Part life will be extended due to the improved abrasion, erosion, and corrosion resistance imparted by the coating, and because geometric tolerances can be maintained for long periods, drilling equipment can operate greater energy efficiency. In the case of steel drill bit bodies, this coating can be applied to the bit body prior to or after brazing cutters in place. The coating would not only improve the abrasion and corrosion resistance of the bit exterior, but would do the same for the flow channel/port used to supply drilling fluids to the cutting surface. Application of the coating after brazing the cutters in place can improve the corrosion resistance of the cutter's carbide substrate.

The superabrasive composites are affixed to the backing or the tool substrate by at least one metal coating using metal electrodeposition techniques known in the art.

Fluid Slurry (Pipe) Conveyance Processes

In many industrial processes, powders, particulates, and slurries must be conveyed from one unit operation to another. One mode of conveyance involves entraining particles in a gas (air) stream or liquid flow. Pneumatic or slurry transfer is accomplished using an air fan or slurry pump to force the particulate laden fluid from one point in the process to the next. The fluid is carried by means of transfer pipes, conveyors, and like equipment, that connects the various unit operations. Depending on the abrasiveness, concentration, particle size, velocity, and other characteristics of the particles in the fluid, a significant amount of wear can occur within the transfer assemblies (e.g., pipes). In particular, where a transfer pipe is required to make either a 90° or other sharp radius turn, the particles will be forced into direct contact with the pipe wall due either to centrifugal settling around a sharp radius or direct impact with the pipe wall. Over a period of time, direct contact with the particulates causes wear into the pipe wall and eventually a hole will form. At this point the fluid will leak or spray from the transfer pipe and the process must be shut down while the pipe is repaired or replaced. The cost of repairing and/or replacing transfer pipes can be significant if the frequency of replacement is high and if the downtime in production during replacement is high.

Conveyance components, especially of mechanical conveyance assemblies, such as, for example, rollers, cams, shafts, and the like, also can have unintended wear surfaces that are impinged by the conveyed fillers and similarly require coating in accordance with the precepts of the present invention.

Existing technologies for extending the life of steel pipes are limited to those techniques that are non-line-of-sight. This excludes technologies such as thermal sprays, physical vapor deposition processes, and many types of cladding using ceramic or tungsten carbide tiles.

In this embodiment of the present invention, the wear surfaces of pipe bends are coated with the metal matrix composite filled with abrasive particles. The same process as described above (e.g., electrolytic or electroless) is used in the same manner as described in greater detail for the forming equipment.

Pumps

Many types of pumps are used for conveying slurries within processes that contain particulates that cause abrasive, erosive and corrosive wear to the pump components. The extent and mode of wear to the pump components is determined by the abrasiveness, particle concentration, particle size, velocity, pH, and other characteristics of the particles and the fluid as well as the operating conditions of the pump such as impellor speed, pressure, etc. Pump types include, inter alia: impeller, progressive cavity, screw, turbine, gear, and vane. Pumps can provide the primary force of conveying abrasive, erosive, or corrosive slurries from one point in the process to another using either centrifugal or positive displacement. In many processes, pumps run continuously for weeks or months at a time. When handling abrasive or corrosive slurries, the wear occurs from the flow of particles within a slurry that abrade the surfaces of the pumps primary components. As the surfaces of these primary components, such as impeller blades, vanes, gears, screws, or rotors wear away even a small amount, the ability of a pump to maintain pressure and convey the slurries becomes greatly diminished. In fact, one indication that pump components are wearing is a drop in line pressure or a drop in slurry volume or flow rate. When pump components wear beyond a certain limit and begin to perform below acceptable process limits, the pumps and/or process lines must be shut down and the components or entire pumps must be replaced. The cost of repairing and/or replacing pumps and pump components can be significant if the frequency of replacement is high and if the downtime in production during replacement is high.

In this embodiment of the present invention, the wear surfaces of pumps are coated with the metal matrix composite filled with abrasive particles. The same process as described above (e.g., electrolytic or electroless) is used in the same manner as described in greater detail for the forming equipment.

Clipper Blade Sets and Combs

Electric hair clippers used for cutting hair for personal grooming and animal shearing applications utilize clipper blades typically are made from hardened steel. A reciprocal motion of the blade over a static comb achieves the cutting action. Both the blade and the comb have matching teeth that are normally sharpened by grinding and lapping. As a hair or fiber is introduced into the clipper, the motion of the upper and lower teeth shears the hair. When the teeth edges are very sharp, the cutting action is obtained with minimal effort and a clean, uniform area of cut hair is obtained in one pass. As the teeth become dull, the cutting becomes less efficient. When this happens, the clippers begin to bind and pull the hairs as they pass through a head of hair or through animal coats. This causes pain and non-uniform cuts. At this point, the blades are deemed dull and must be replaced or re-sharpened. The length of time before re-sharpening is needed depends on the frequency and characteristics of the hair being cut. In commercial sheep and llama farms for example, the wool will contain dirt particles and other abrasive elements that accelerate the dulling of the clipper blades.

Typical clipper blade sets are made from common steels. The teeth are sharpened using grinding and lapping techniques. The cutting performance can be further enhanced by blade set designs that utilize more sophisticated tooth geometries. Clipper blades are routinely coated with thin lubricating oil that reduces friction and helps prevent corrosion. In most cases, clipper blade sets are not surface treated to improve or enhance the hardness or wear resistance of the blades. When the blades become dull and ineffective, they can either be re-sharpened or replaced.

Diamond (or cubic boron nitride) metal composites are highly inert, wear resistant, and possess a low coefficient of sliding friction. The application of these composites to hair clipper set components will reduce wear, maintain or improve comfort for longer periods of time, and reduce total operating costs by extending the life of the blades thereby reducing the number of times the blades need to be replaced or re-sharpened. In this embodiment of the present invention, then, the wear surfaces of, inter alia, clipper blades and combs are coated with the metal matrix composite filled with abrasive particles. The same process as described above (e.g., electrolytic or electroless) is used in the same manner as described in greater detail for the forming equipment.

CONCLUSION

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. The following examples show how the present invention can be practiced, but they should not be construed as limiting. In this application all units are in the metric system and all amounts and percentages are by weight, unless otherwise expressly indicated. Also, all citations referred herein are expressly incorporated herein by reference.

EXAMPLES

Example 1

Figure 5:
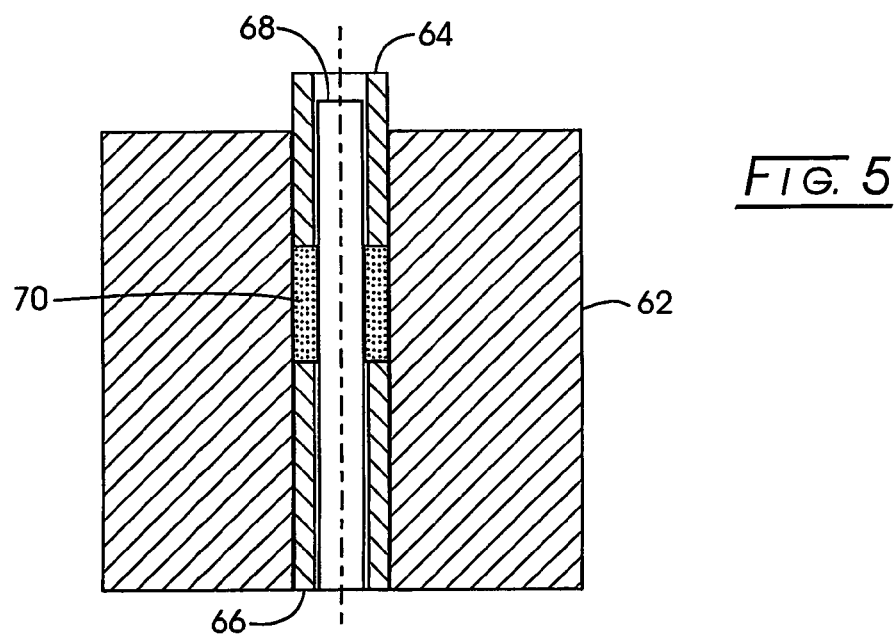
FIG. 5 is a cross-sectional view through a conventional punch and die set.

A punch and die set is comprised of a die, 62, an upper punch, 64, and lower punch, 66, and a core rod, 68, as shown in FIG. 5, where all parts are made of 1.2379 steel having a Rockwell C hardness of 63. The die set is used for forming a ring or small wheel from a phenolic resin powder, 70, that contains 10 to 20 weight percent cubic boron nitride abrasive filler having a particle size of 400 mesh or coarser. In normal operation, the punch and die set is assembled as in FIG. 5 and the plastic powder is pressed between the two punches. When a load is placed on the punches, the powder compresses and the abrasive particles scratch the sides of the die and core pin. After approximately 50 to 60 cycles, the wear zone caused by the abrading particles in the filler becomes so pronounced (particularly adjacent to powder 70) that the resin disk that is formed is outside the allowable dimensional tolerance and the punch and die set must be replaced.

In demonstrating this invention, a steel punch and die set was obtained consisting of 1.2379 type steel with Rockwell Hardness C die having an outer diameter of 30 mm and inner diameter of 6.3 mm. The height of the die was 30 mm. A core pin and punches made of similar steel also were obtained. Approximately 0.010 mm of superabrasive coating containing 2-micron mean size monocrystal diamond particles at approximately 30 volume percent was applied to the inner diameter of the die and to the core rod. The following coating procedure was used:

1. Masking Steps:
   (a) Clean the surface of the die and core pin by wiping with a clean cloth and propanol to remove any surface residue.

(b) Mix up the stop-off (Evans Manufacturing, Peel Coat Type II B-90) and paint the stop-off on the outside wall and ends of the die. Let paint dry well and apply a second coat of paint and let dry.
2. Pretreatment Steps for Activating Metal Surface for Nickel Plating:
   (a) As generally described in *Metals Handbook, Ninth Edition*, "Selection of Cleaning Process", pp. 3-32, American Society for Metals, 1982.
3. Plating Process:
   (b) As generally described in *Metals Handbook, Ninth Edition*, "Electroless Nickel", pp. 219-223, American Society for Metals, 1982; or Sheela, et. al., "Diamond-Dispersed Electroless Nickel Coatings," *Metal Finishing*, 2002. The nickel bath generally comprised:
      (i) 6 volume percent nickel sulfate solution containing 26 g/L nickel.
      (ii) 15 volume percent sodium hypophosphate solution containing 24 g/L hypophosphate.
      (iii) 74 volume percent de-ionized water.
      (NOTE: The Ni concentration of the bath is maintained at about 5.4-6.3 g/L throughout the operation.)
   (c) Heat nickel bath to approximately 190° F. (87°-88° C.).
   (d) 5 grams per liter of 1-3 micron monocrystalline diamond powder and pre-disperse in 5 volume percent de-ionized water (5 volume percent of nickel bath).
   (e) Attach die and core pin to rotating racking system and submerge in solution.
   (f) Begin rotating parts slowly (approx. 0.5-2 rpm) and add diamond slurry.
   (g) Every fifteen minutes, replenish the bath as follows:
      (i) 0.6 volume percent nickel sulfate
      (ii) 0.6 volume percent pH modifier
   (h) Run plating process long enough for 30 minutes until desired thickness of 10 microns is obtained. (This process generally shows a plating rate of about 20 to 25 microns per hour).
   (i) When approaching desired stopping point, allow the bath to "plate out" by eliminating the last replenishment.
   (j) Remove plated part from solution and rinse with water. Wipe dry to eliminate watermarks.
   (l) Remove stop-off used for masking the mold.
4. Heat Treating:
   Place coated part into furnace and heat to 300 to 350° C. for 1 to 2 hours in air atmosphere.

Alternatively, the superabrasive coating can be applied to the punch and die set by commercial providers of this coating. Two commercial providers include: Surface Technology Inc, Robbinsville, N.J. and ESK Ceramics (Wacker-Chemie), Kempten, Germany.

When the punch and die set was coated with the superabrasive coating, the set was placed into service using the resin having the abrasive filling containing approximately 10-20 volume percent cubic boron nitride abrasive powder with particle size coarser than 400 mesh. The superabrasive-coated punch and die set produced resin disks that met the dimensional quality criteria required for this product. After 200 cycles, the superabrasive coated punch and die set still produced disks that met the quality criteria indicating that the diamond coating has reduced the abrasive wear on the mold and die surfaces.

This experiment demonstrates the effectiveness of a punch and die set having improved wear resistance characteristics manufactured according to the process described above.

Example 2

Figure 6:
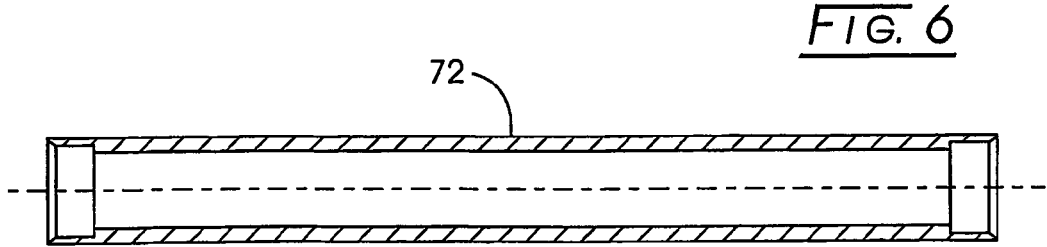
FIG. 6 is a cross-sectional view through a conventional pressure roll.

A pressure roll, 72, as shown in cross-section in FIG. 6 was used for forming a cement composite material into pipes. The normal pressure roller is a 96 mm diameter by 835 mm long roll made from DIN 2448 stainless steel. In the normal mode of operation, 24 pressure rolls, in two sets of 12 each, apply uniform pressure to a roll that is in direct contact with the cement composite material. As the cement material contacts the roll, a small layer of the abrasive cement is retained on the surface of the roll and, as this rotates, is carried across the pressure rolls. Over a period of 4 to 6 weeks of continuous operation, the roll surfaces wear away, usually in non-uniform levels from roller to roller. The normal wear pattern that forms is a series of very obvious grooves across the face of the roll. The depth of the grooves determines the severity of the wear. The non-uniformity of this wear results in unacceptable thickness variations in the cement pipe that is being formed. At this point, the grooves are deep enough to be felt by feeling them and the process line must be shut down and the pressure rollers discarded and replaced.

A full set of twenty four pressure rollers made of DIN 2448 stainless steel was coated with a superabrasive composite coating using the process described in Example 1 except using a larger tank and volume of chemicals and containing 8 micron diamond particles at approximately 40 volume percent. Also, because the material was stainless steel, a thin electrolytic nickel strike layer was applied as a pretreatment step before the electroless technique was employed. The thickness of the coating was 0.002 inches or 50 microns.

When the pressure rolls were coated, the entire set of twenty four were installed in the cement composite pipe forming application. After 4 weeks of continuous operation, the process was stopped and the pressure rolls were cleaned in place to remove residual cement and visually inspected. The visual inspection revealed that no significant wear was seen on any of these rolls and the process was started again and run continuously for 4 more weeks. After this time, the process was stopped, the rolls cleaned in place and the rolls visually inspected as before. Again, no significant wear was noted and the rolls were left in place to continue for an additional 4 weeks. As of Jan. 9, 2004 the pressure rolls with the superabrasive coating have been running for at least 12 weeks.

This example illustrates the effectiveness of a pressure roll having improved wear resistance characteristics manufactured according to the processes described in Example 1.

Example 3

Figure 7A:
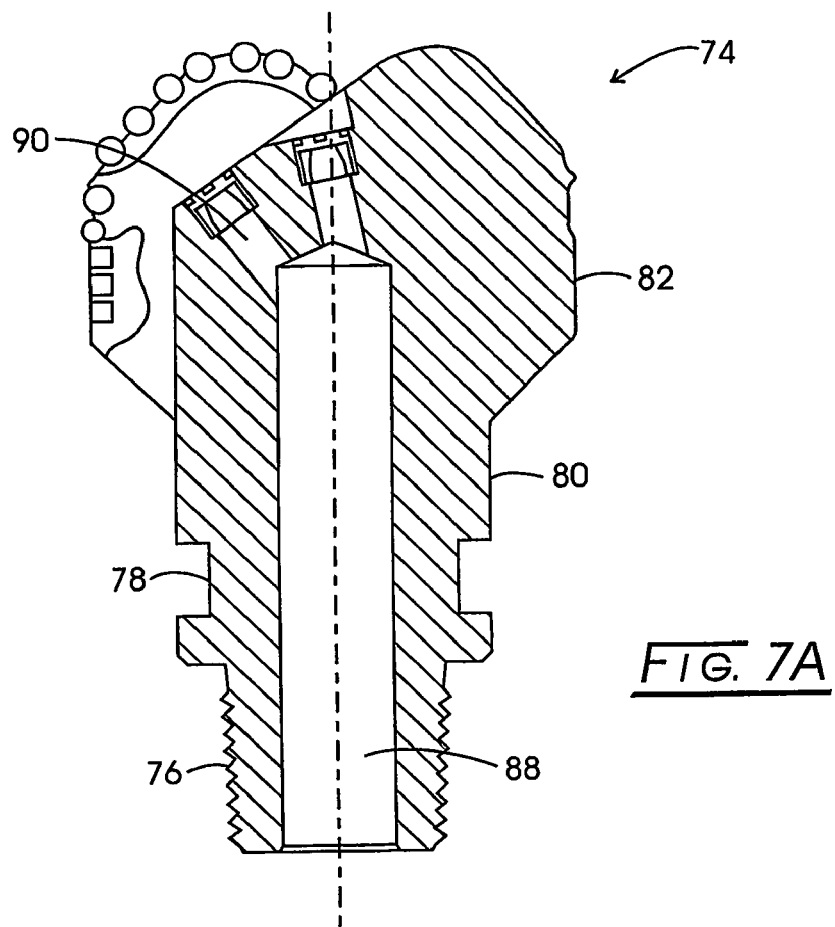
FIGS. 7A and 7B are simplified drawings of a conventional steel body drag bit with diamond studded cutters.
Figure 7B:
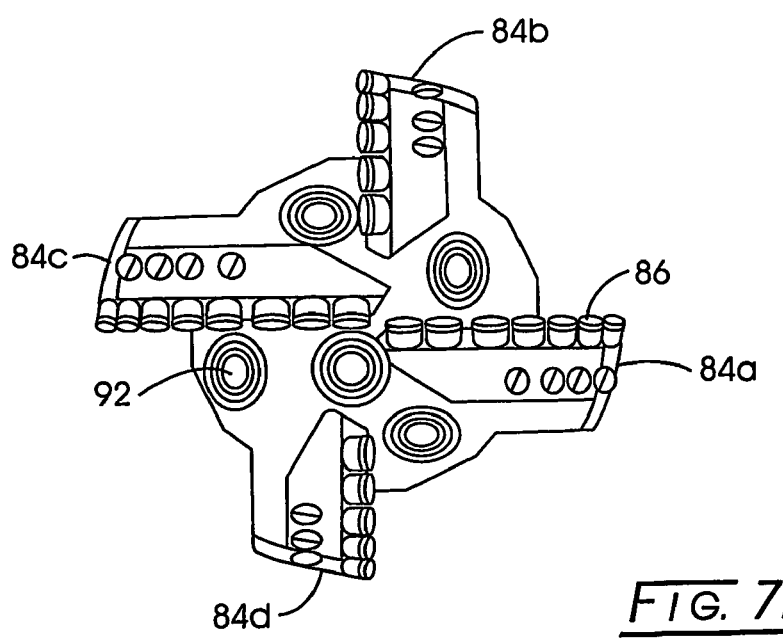

A steel-body, drag-type drill bit, 74, as shown in FIGS. 7A and 7B, normally is used for drilling oil wells. Steel body bits range in diameter from 8 inches to over 17 inches. The steel body bits are made in a variety of configurations, but generally are comprised of the threaded pin connection, 76, a bit breaker slot, 78, a shank, 80, a gauge, 82, over which rides blades, 84*a-d*, that can have various configurations that are normally arranged in a symmetrical pattern of 2 to 10 blades. In some cases, gauge 82 may be a full or partial ring. Onto each blade are brazed the polycrystalline diamond cutters (PDC), as PCD cutter 86, that are arranged according to the cutting efficiency that is required for each bit. Within the main body of the bit is a shank bore, 88, that extends up to gauge 82 of bit 74. From the end of shank bore 88, smaller holes, as small bore 90, are drilled and extend out between the blades. The smaller holes are normally threaded so that nozzles, as nozzle 92, can be inserted. The nozzles usually wear at a faster rate than the rest of the bit and are normally replaced at more frequent intervals.

A steel body bit is used for drilling holes that can be as deep as 10,000 feet. The rate of penetration (ROP) is strongly influenced by the geologic formations that must be drilled through. Although ROP values can range from 25 to 200 ft per hour, typical ROP values are on the order of 30 to 50 feet per hour. Depending on the depth of the drill hole, a typical steel body bit might be used for 30 to 50 hours before completing a hole. In many cases, the diamond cutters on the bit will still be functional, but other features of the bit body may be extensively worn due to the erosive properties of the drill cuttings and drilling mud. In most cases, drill bits can be repaired at least one or two times and used for a total of 100 to 150 hours before either the PDC and/or bit body are in such a state of wear that they must be discarded. In most cases, the PCD cutters have more useful life that could be attained, but are limited by the wear of the bit body. Any additional life that can be obtained from a drill bit helps to significantly reduce the overall drilling costs.

A new 8¾ inch steel body drill bit as shown in FIG. 7 was obtained. The bit had features similar to that described above having four blades, four nozzle ports (the nozzles were removed from the bit), and a partial ring gauge. The 8¾ inch bit was prepared for a superabrasive coating using the following process:

(a) All paint was completely removed from the bit using a mild grit-blasting process.
(b) The threads on the API pin connection and the make-up face including the bevel were masked to prevent the superabrasive coating from adhering to these surfaces. This was accomplished by cleaning the surface of the threads, wiping with a clean cloth and isopropanol to remove any surface residue. Mix up the stop-off (Evans Manufacturing, Peel Coat Type II B-90) and paint the stop-off on the outside wall and ends of the die. Let paint dry well and apply a second coat of paint and let dry. The opening of the shank bore was not masked as the inside diameter of these surfaces are intended to be coated with the superabrasive coating.
(c) In addition to the API Pin connection, the threaded walls of the nozzle ports were also masked.
(d) No effort was made to mask the diamond cutters, as it is recognized that the coating will not adhere to the diamond surfaces and upon initial use, the coating on these surfaces will readily spall off.
(e) After these preparations are made, a superabrasive coating under the trade-name of Composite Diamond Coating (Surface Technology Inc. 105 North Gold Drive, Robbinsville, N.J. 08691) was applied. The coating for this particular bit utilized a monocrystalline diamond powder having a mean size of 8 microns. The volume percent of diamond incorporated within the coating was approximately 40 percent. The coating thickness was approximately 125 microns.
(f) After the Composite Diamond Coating was applied, the masking was removed from the areas where it was applied. In some cases, a post coating heat treatment can be applied at temperatures ranging from 200° C. to 400° C. for a time period of 1 to 2 hours in order to improve the hardness of the metal matrix that comprises the composite coating. In this case, no heat treating was performed because of concerns about degradation of the integrity of the PDC braze joints.

After the superabrasive coating was applied to the drill bit, the bit was taken to a drilling site. Typically, drill bits in this location last approximately 100 to 150 hours in 2 or 3 runs until it must be completely replaced. Under these drilling conditions, a normal drill bit will show clear signs of wear over the tops of the blades, between the cutters, on the bit face adjacent to the exit from the nozzle bores and at the entry to the nozzle ports in the internal bore.

In the case of the superabrasive drill bit, the bit was run for a normal length of time and pulled from the hole for inspection. It was clear from the inspection that, although the superabrasive coating had been significantly removed in the critical areas, the coating reduced the wear that would normally occur. In fact, other than the wear on the diamond cutters, the bit is essentially at the same state as a new bit and one would expect that the bit can still be run for an additional 100 to 150 hours even after all of the coating has been eroded away. The coating of 125 microns thickness has essentially added at least 50 hours of life to this bit giving a life expectancy of at least 150 to 200 hours. One can also expect that if the coating thickness were increase to 2× that of this example, then the life of the bit could be increased by 100 hours or two additional runs. The bit is re-runable and will be run again.

Example 4

A new 9⅞ inch steel body drill bit as shown in FIG. 6 was obtained. The bit has features similar to that described in Example 4 above having four blades, four nozzle ports (the nozzles were removed from the bit), and a partial ring gauge. The 9⅞ inch bit was prepared for a superabrasive coating using the same process as described in detail in Example 4.

After these preparations were made, a superabrasive coating under the trademark of Composite Diamond Coating (Surface Technology Inc. 105 North Gold Drive, Robbinsville, N.J. 08691) was applied. The coating for this particular bit utilized a monocrystalline diamond powder having a mean size of 8 microns. The volume percent of diamond incorporated within the coating was approximately 40 percent. The coating thickness was approximately 100 microns.

After the Composite Diamond Coating was applied, the masking was removed from the areas where it was applied. In some cases, a post coating heat treatment can be applied at temperatures ranging from 200° C. to 400° C. for a time period of 1 to 2 hours in order to improve the hardness of the metal matrix that comprises the composite coating. In this case, no heat-treating was performed because of concerns about degradation of the integrity of the PC braze joints.

After the superabrasive coating was applied to the drill bit, the bit was taken to a drilling site where extensive oil drilling was occurring. Typical drill runs in this area last from 100 to 150 hours until a drill bit must be replaced. Under these drilling conditions, a normal drill bit will show clear signs of wear over the tops of the blades, between the cutters, on the bit face adjacent to the exit from the nozzle bores and at the entry to the nozzle ports in the internal bore.

In the case of the superabrasive drill bit, the bit was run for a nominal run and pulled from the hole for inspection. In this case, it was clear from the inspection that, although the superabrasive coating had been significantly removed in the critical areas, the coating reduced the wear that would normally occur. In fact, other than the wear on the diamond cutters, the bit is essentially at the same state as a new bit and one would expect that the bit can still be run for an additional 100 to 150 hours even after all of the coating has been eroded away. The coating of 100 microns thickness has essentially added at least 30 hours of life to this bit giving a life expectancy of at least 130 to 180 hours or nearly one additional run. One can also expect that if the coating thickness were increase to 3× that of this example, then the life of the bit could be increased by 90 hours. This bit is re-runable and will be run again.

Example 5

Figure 8:
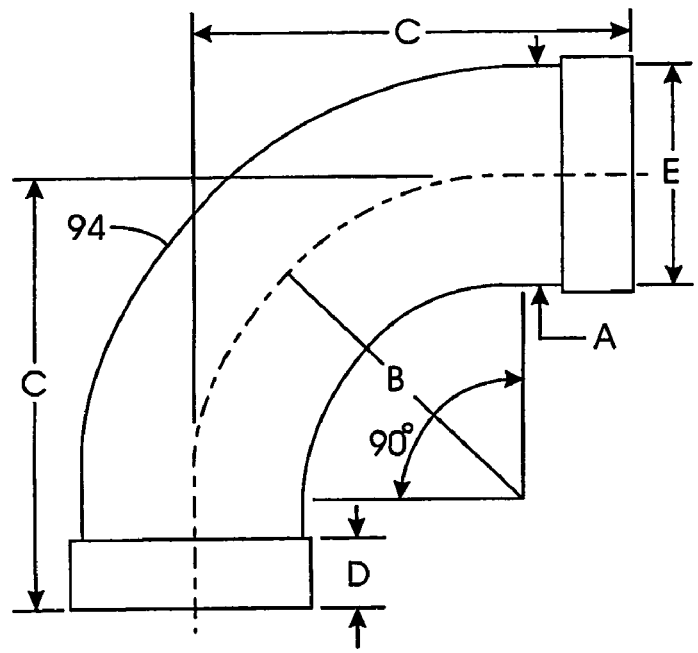
FIG. 8 is a plan view of a conventional pipe elbow.

Steel transfer pipe, 94, shown in FIG. 8 can be used for conveying a metallic powder from a chelsonating machine to a mixer in a blending process. The powder is a proprietary mix of iron, nickel, and graphite. The 2 inch inside diameter transfer pipe is made of steel and is in the form of a 90° elbow. In a normal production mode, the powders are processed in a chelsonating machine that mixes and presses the particles in the powder together. The mixed powders fall by gravity from the chelsonating unit to a mixer by passing through a series of steel pipes that includes the 90° elbow. Under normal process conditions, 16 batches of powder, each comprising 360 Kg, are processed in one week. Historical process records show that a typical 90° elbow will last approximately three months or 172 batches, after which a hole develops in the transfer pipe elbow. When this happens, the entire process must be shut down for approximately 2 to 4 hours while the old pipe is removed and a new pipe is installed.

A steel transfer pipe, similar to that previously described and illustrated in FIG. 8, was obtained and a superabrasive matrix coating was applied to the inside area of the pipe. The pipe was prepared for the superabrasive coating by using following the process described in Example 1. Although only the inner walls of the pipe are in contact with the powder, both the inside and outside of the pipe were coated with the superabrasive coating in order to minimize the masking of the outside of the pipe. The coating was applied to a thickness of 0.100 mm using a diamond powder with a mean size of 8 microns and a volume concentration of 40 percent diamond. After the superabrasive coating was applied, the transfer pipe was heated to 350° C. for two hours to increase the hardness of the nickel matrix. The change in thickness of the pipe due to the addition of the coating did not affect the dimension required for installation.

The superabrasive pipe was installed in the same section of the process where the normal pipe is located on Sep. 13, 2003 and the process was started thereafter. As of Feb. 4, 2004, approx 203 batches have been processed through this pipe. An inspection of the pipe in mid-January, indicated that the pipe showed no signs of wear Example 6

Figure 9:
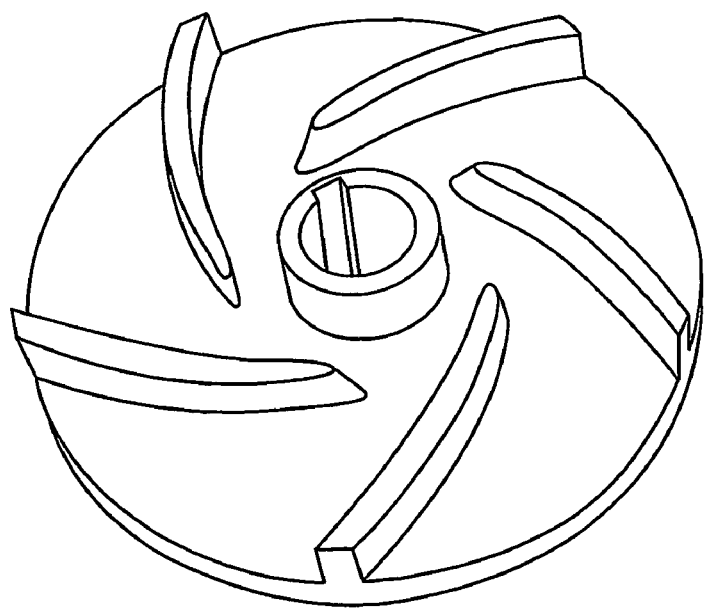
FIG. 9 is a perspective view of conventional steel pump impeller.

A rotor assembly, 96, as shown in FIG. 9 for a self-priming, centrifugal pump is made of cast iron. The rotor is an integral part of the pump. The rotor blades are of such dimension that the distance between the tips of the rotor and the pump housing is critical for pump performance. As the tips of the blades wear away due to abrasion, erosion, or corrosion, even by a few millimeters, the performance of the pump will diminish significantly. The performance of a pump is usually measured in terms of pressure and flow rate. In order to evaluate the performance of pumps and pump components, an accelerated wear test has been devised such that a centrifugal pump is made to pump in a recirculating mode, an abrasive laden slurry from a holding tank through the pump and back into the holding tank again. The abrasive slurry can be water with aluminum oxide particles, water with metal chips or any other liquid with solid particles that will flow through the pump.

In the case of a normal centrifugal pump having a cast iron rotor as shown in FIG. 7, the performance of the pump will be such that the pressure created by the pump will fall steadily and continuously after one day of operation to about 5 to 10 days, after which the required pressure and flow rate of the pump cannot be maintained at required levels. Inspection of the cast iron rotor after this time normally reveals that from several millimeters to centimeters of the rotor blades have been worn away from the original profile. The change in the dimension and profile of the blades is what changes the hydrodynamics of the pump resulting in loss of pressure and flow.

A 129 mm diameter cast iron rotor as shown in FIG. 7 was prepared for a superabrasive coating using a similar technique as described in Example 1. In addition, the bore of the rotor was masked so that the superabrasive coating would not adhere to these surfaces and, thus, alter the dimension and prevent the rotor from fitting onto the motor shaft. The superabrasive coating was applied to a thickness of 0.200 mm or 200 microns. The coating contained 8-micron diamond particles at a volume concentration of approximately 40 percent. The rotor was heat treated at 350° C. for 2 hours. After the coating was applied, the masking material was removed from the center bore.

When the superabrasive coating was applied, the rotor was installed within the pump and the accelerated wear test was performed using the same procedure as previously described. The pump was run for two weeks of continuous service pumping an aluminum oxide slurry in a recycling mode. The pump maintained adequate pressure and flow rate during this time. After the two-week test using an aluminum oxide slurry, the pump was run continuously for one week pumping a slurry containing metal chips. During this week of operation, the pump also maintained a steady pressure and flow rate. These tests conditions and durations represent standard conditions of an accelerated wear test.

After the standard tests were completed, the pump rotor was removed from the pump assembly. Inspection of the rotor verified that the blades were fully intact dimensionally and the profile was unaltered. A piece of the rotor blade was removed by breaking it off of the rotor. This section of blade was mounted into a Bakelite resin pellet and polished with a diamond polishing paste to reveal a cross-section of the blade including the coating thickness on both sides of the blade. Scanning electron microscope analysis of the blade section was performed and dimensional analysis of the superabrasive coating was performed on both sides of the blade. From these analyses, it was determined that the superabrasive coating ranged in thickness from 183 microns to 199 microns. This represents a minimal wear loss based on the fact that the original coating thickness was 200 um. This demonstrates that the improved rotor maintained dimensional stability during the testing and that this allowed the pump to perform at a steady pressure and flow rate.

Example 7

This example demonstrates the unexpected advantages of using monocrystalline diamond in a low phosphorus content metal composite coatings to protect wear surfaces compared to the use of polycrystalline diamond in a high phosphorus content metal composite. In order to demonstrate such unexpected advantages, conventional shock synthesis polycrystalline diamond (1.65 µm mean particle size) was incorporated into a high phosphorus Ni coating (9% phosphorus) and a Taber panel was coated (6.4 g/cc coating specific gravity) as conventionally taught. The inventive coating utilized monocrystalline diamond (1.75 µm mean particle size) and duplicate test are reported. The inventive coating, as taught herein, utilized low phosphorus nickel (3% P). All coatings were coated using the general technique described in Example 1 at a diamond level of but 30 vol-% in the coatings.

The following test results were recorded.

TABLE 1

Taber Abraser Model 5130 Analysis

| Sample ID | Type of Wheel | Load (grams) | Number of Cycles | Initial Weight (g) | Final Weight (g) | Weight Loss (mg) | Taber Wear Index |
|---|---|---|---|---|---|---|---|
| CDC-2 | CS-10 | 1000 | 1000 | 70.6943 | 70.6892 | | |
| | | | 3500 | | 70.6877 | 1.5 | |
| | | | 5000 | | 70.6871 | 0.6 | |
| | | | 10000 | | 70.6832 | 3.9 | 0.78 |
| CDC (2.2 mil) | CS-10 | 1000 | 1000 | 70.6877 | 70.687 | | |
| | | | 2500 | | 70.6862 | 0.8 | |
| | | | 5000 | | 70.6848 | 1.4 | |
| | | | 10000 | | 70.6809 | 3.9 | 0.78 |
| | | | Wear Index of last 5000 Cycles = 0.78 | | | | |
| | | | Coating Specific Gravity = 6.4 g/cm3 | | | | |
| | | | Wear Rate in μm per day = 3.76 | | | | |
| CDC-Poly (1-3 μm) | CS-10 | 1000 | 1000 | 68.6411 | 68.6343 | | |
| | | | 3500 | | 68.6318 | 2.5 | |
| | | | 5000 | | 68.63 | 1.8 | |
| | | | 10000 | | 68.6254 | 4.6 | 0.92 |
| | | | Wear Index of last 5000 Cycles = 0.92 | | | | |
| | | | Coating Specific Gravity = 6.4 g/cm3 | | | | |
| | | | Wear Rate in μm per day = 4.44 | | | | |

Taber Wear Index = (weight loss in mg) × 1000/# of cycles

The above-tabulated results demonstrate that inventive metal matrix coatings provided about an 18% improvement in abrasion resistance, as measured by Taber abrasion resistance. Not evident from these data is the substantial cost savings realized by the inventive monocrystalline diamond metal matrix coatings, which, at today's prices, result in about a 10-fold savings in cost per carat of diamond. Also not evident from this data is the deposition rate of the inventive monocrystalline diamond metal matrix coatings, which exhibited a deposition rate of about 10-25 microns of nickel coating thickness per hour compared to that of the comparative high phosphorus coating, which was measured at about 5-8 microns per hour. This is an improvement in coating rate of about 3 to 5 times.

It is unexpected that the inventive monocrystalline diamond metal matrix coatings can be coated at a remarkable higher rate, cost orders of magnitude less, and exhibit improved performance compared to conventional high phosphorus polycrystalline metal matrix coatings, such as exemplified by Micro-Surface Corporation (www.microsurfacecorp.com).

We claim:

1. Process equipment, comprising:
   a substrate, and
   a filler material process wear surface coated with a coating comprising a metal selected from the group of nickel or nickel alloys and superabrasive particles comprising synthetic monocrystalline diamond; and
   one or more of hexagonal boron nitride (hBN), SiC, $Si_3N_4$, WC, TiC, CrC, $B_4C$, and $Al_2O_3$;
   wherein said superabrasive particles are between about 0.1 microns to less than about 50 microns, and wherein the coating has a thickness from greater than about 2 microns to about 1000 microns.

2. The equipment of claim 1 wherein:
   the superabrasive particles comprise between about 5 and about 80 volume-percent of the coating.

3. The equipment of claim 1, wherein
   the coating further comprises one or more of nickel, nickel alloys, silver, silver alloys, tungsten, tungsten alloys, boron, tantalum, stainless steel, chromium, molybdenum, vanadium, zirconium, titanium, tungsten, a ceramic, a glass, talcum, a plastic, a metal graphite, a metal oxide, a metal silicide, a metal carbonate, a metal carbide, a metal sulfide, a metal phosphate, a metal boride, a metal silicate, a metal oxylate, a metal nitride, or a metal fluoride.

4. The equipment of claim 1, wherein the wear surface is a that of a forming tool for one or more of rolling, shearing, bending, drawing, swaging, hot forging, coining, extrusion, injection molding, compression molding, transfer molding, or laminating.

5. The equipment of claim 1, wherein the wear surface is that of process equipment extrusion equipment or compounding equipment.

6. The equipment of claim 1, wherein the wear surface is that of size reduction equipment or size classification and separation equipment.

7. The equipment of claim 1, wherein the wear surface is that of an orifice.

8. The equipment of claim 1, wherein the wear surface is that of a turbine engine, a diesel engine, or an Otto cycle engine.

9. The equipment of claim 1, wherein the wear surface is that of a projectile weapon.

10. The equipment of claim 1, wherein the wear surface is that of a radial bearing, thrust bearing, mechanical couplings, wear pad, flow diverter, flow restrictor, mud pump liner, impeller, drill pipe, valve, directional drilling assembly, hanger assembly, percussion assembly, nozzle, or core lifter.

11. The equipment of claim 1, wherein the wear surface is that of a conveyance assembly for conveying a filler comprising ceramic, glass, mineral, cermet, metal, organic material, cementitious material, ice, or biomass.

12. The equipment of claim 1, wherein the wear surface is that of a pump.

13. The equipment of claim 1, wherein the wear surface is that of a clipper blade or a clipper comb.

14. The equipment of claim 1, wherein the wear surface is that of discontinuous fiber production equipment.

15. A transfer assembly, comprising:
   a filler material process wear surface coated with a coating comprising a metal and superabrasive particles comprising synthetic monocrystalline diamond; and
   one or more of hexagonal boron nitride (hBN), SiC, $Si_3N_4$, WC, TiC, CrC, $B_4C$, and $Al_2O_3$;
   wherein the superabrasive particles comprise between about 5 and about 80 volume-percent of the coating; and have an average particle size that ranges from about 0.1 to about 50 microns;
   wherein the coating has a thickness from about 0.5 to about 1000 microns.

16. The transfer assembly of claim 15, wherein the wear surface is that of a pipe, a projectile weapon barrel, or an extruder.

17. Process equipment, comprising:
   a substrate, and
   a filler material process wear surface coated with a coating comprising a metal selected from the group of nickel or nickel alloys and superabrasive particles comprising synthetic monocrystalline diamond; and
   one or more of hexagonal boron nitride (hBN), SiC, $Si_3N_4$, WC, TiC, CrC, and $B_4C$;
   wherein said superabrasive particles are between about 0.1 microns to less than about 50 microns, and wherein the coating has a thickness from greater than about 2 microns to about 1000 microns.

* * * * *